(12) United States Patent
Kray et al.

(10) Patent No.: US 11,131,247 B2
(45) Date of Patent: Sep. 28, 2021

(54) ADDITIVELY MANUFACTURED ROTATING SHAFT

(71) Applicant: General Electric Company, Schenectady, NY (US)

(72) Inventors: Nicholas Joseph Kray, Mason, OH (US); Nitesh Jain, Bangalore (IN); Srinivasarao Surapu, Bangalore (IN)

(73) Assignee: General Electric Company, Schenectady, NY (US)

(*) Notice: Subject to any disclaimer, the term of this patent is extended or adjusted under 35 U.S.C. 154(b) by 484 days.

(21) Appl. No.: 15/883,336

(22) Filed: Jan. 30, 2018

(65) Prior Publication Data
US 2019/0234313 A1 Aug. 1, 2019

(51) Int. Cl.

| | |
|---|---|
| *F02C 7/32* | (2006.01) |
| *F16C 3/02* | (2006.01) |
| *B33Y 80/00* | (2015.01) |
| *F01D 5/06* | (2006.01) |
| B22F 5/10 | (2006.01) |
| B33Y 10/00 | (2015.01) |
| B22F 10/20 | (2021.01) |

(52) U.S. Cl.
CPC ............... *F02C 7/32* (2013.01); *B33Y 80/00* (2014.12); *F01D 5/06* (2013.01); *F16C 3/02* (2013.01); *F16C 3/023* (2013.01); *B22F 5/10* (2013.01); *B22F 10/20* (2021.01); *B33Y 10/00* (2014.12); *F05D 2230/30* (2013.01); *F16C 2360/23* (2013.01); *Y10T 464/50* (2015.01)

(58) Field of Classification Search
CPC .... F02C 7/32; F16C 3/02; F16C 3/023; F16C 2360/23; F01D 5/06; Y10T 464/50; B33Y 10/00; B33Y 80/00; F05D 2230/22; F05D 2230/31; F05D 2230/234; F05D 2230/30; B22F 2999/00; B22F 5/106; B22F 3/1055; B22F 5/10
USPC ......................................................... 464/180
See application file for complete search history.

(56) References Cited

U.S. PATENT DOCUMENTS

| | | | |
|---|---|---|---|
| 1,490,219 | A | 4/1924 | Labberton et al. |
| 1,734,268 | A | 11/1929 | Moorhouse |
| 2,017,609 | A | 10/1935 | Sparrow |
| 3,099,141 | A | 7/1963 | Garten et al. |
| 3,814,549 | A | 6/1974 | Cronstedt |
| 4,043,147 | A | 8/1977 | Wiebe |
| 4,272,971 | A | 6/1981 | Loyd et al. |
| 6,522,092 | B2 | 2/2003 | Sakurai et al. |

(Continued)

FOREIGN PATENT DOCUMENTS

DE 4319260 A1 12/1993

*Primary Examiner* — Greg Binda
(74) *Attorney, Agent, or Firm* — Dority & Manning, P.A.

(57) ABSTRACT

A rotating shaft and a method for additively manufacturing the rotating shaft are provided. The rotating shaft includes an elongated body extending along an axial direction and including an inner surface that defines a hollow central portion. An internal support structure extends from the inner surface into the hollow central portion to stiffen the rotating shaft and provide a high stiffness-to-weight ratio. The internal support structures may include stiffening ribs, truss structures, mesh structures, solid disks, and/or regions having a decreased density relative to the elongated body. The elongated body and some or all internal features may be integrally formed as a single monolithic component.

17 Claims, 3 Drawing Sheets

(56) References Cited

U.S. PATENT DOCUMENTS

| | | | |
|---|---|---|---|
| 6,579,187 B2* | 6/2003 | Ramey | F16D 3/845 |
| 6,918,839 B2 | 7/2005 | Holemans et al. | |
| 7,438,612 B2* | 10/2008 | Wada | F16F 15/10 |
| | | | 464/180 |
| 8,118,064 B2 | 2/2012 | Nakajima et al. | |
| 8,715,094 B2 | 5/2014 | Wang et al. | |
| 8,801,526 B1 | 8/2014 | Conger et al. | |
| 9,506,497 B2 | 11/2016 | Khanfar et al. | |
| 10,294,982 B2* | 5/2019 | Gabrys | F16C 3/02 |
| 2013/0319140 A1 | 12/2013 | Brault et al. | |
| 2014/0141894 A1 | 5/2014 | Freund et al. | |
| 2015/0323040 A1* | 11/2015 | Patino Crespo | F16F 15/13164 |

* cited by examiner

ADDITIVELY MANUFACTURED ROTATING SHAFT

FIELD

The present subject matter relates generally to rotating shafts for use in machinery, and more particularly, to additively manufactured rotating shafts for use in gas turbine engines.

BACKGROUND

Rotating shafts may be used for coupling rotating components within a machine or system of components, e.g., to transfer rotational energy between two or more components. For example, a drive shaft may be used to operably couple a high or low pressure spool of a gas turbine engine to an accessory component, such as an accessory gearbox. The accessory gearbox may then use rotational energy generated by the core engine to perform useful auxiliary functions within the engine or an associated aircraft.

However, conventional rotating shafts experience undesirable vibrations, particularly during high speed operation. For example, a drive shaft that couples an accessory gearbox to a low pressure spool of a gas turbine engine, which is commonly referred to as a radial drive shaft, may experience vibrations due to unbalanced loads, foreign object debris loads, cross wind loads, etc. As a result, conventional rotating shafts are substantially solid in order to achieve the desired stiffness and reduce vibrations below an acceptable level. However, solid metal rods are typically very heavy resulting in increased manufacturing costs and wasted energy.

Accordingly, an improved rotating shaft for transmitting rotational force in a gas turbine engine or other machinery would be useful. More specifically, a rotating shaft that is easy to manufacture, is lightweight, and is stiff enough to resist harmful vibrations during high speed operation would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, an additively manufactured rotating shaft defining an axial direction and a radial direction is provided. The rotating shaft includes an elongated body extending along the axial direction and including an inner surface that defines a hollow central portion. An internal support structure extends from the inner surface into the hollow central portion.

In another exemplary aspect of the present disclosure, a method of manufacturing a rotating shaft is provided including depositing a layer of additive material on a bed of an additive manufacturing machine and selectively directing energy from an energy source onto the layer of additive material to fuse a portion of the additive material and form the rotating shaft. The rotating shaft includes an elongated body extending along an axial direction and including an inner surface that defines a hollow central portion. An internal support structure extends from the inner surface into the hollow central portion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
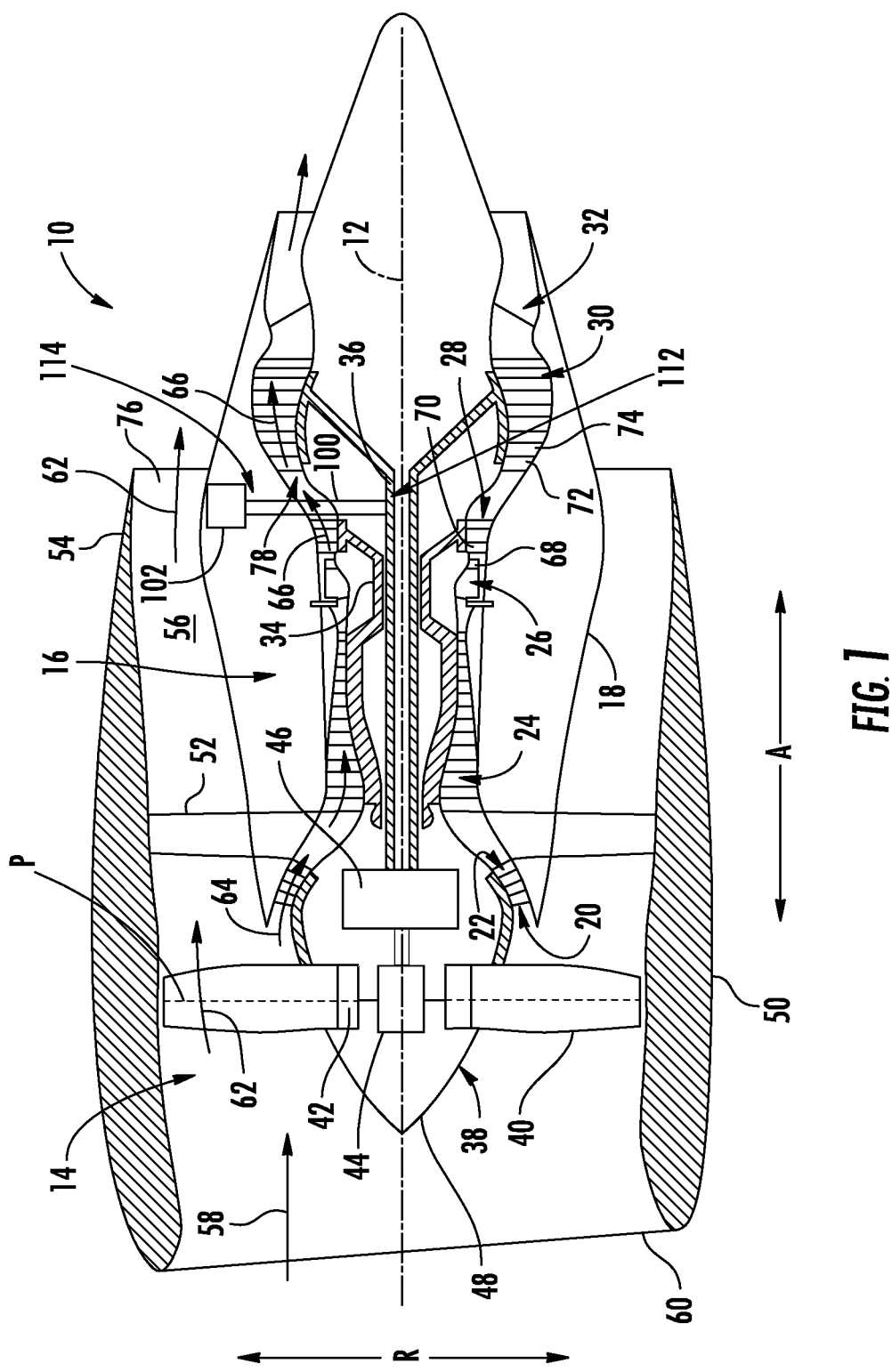
FIG. 1 is a schematic cross-sectional view of an exemplary gas turbine engine according to various embodiments of the present subject matter.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a thermal management system, with forward referring to a position closer to component inlet and aft referring to a position closer to a component exhaust. The terms "upstream" and "downstream" refer to the relative direction with respect to fluid flow in a fluid pathway. For example, "upstream" refers to the direction from which the fluid flows, and "downstream" refers to the direction to which the fluid flows. Furthermore, as used herein, terms of approximation, such as "approximately," "substantially," or "about," refer to being within a ten percent margin of error.

The present disclosure is generally directed to a rotating shaft and a method for additively manufacturing the rotating shaft. The rotating shaft includes an elongated body extending along an axial direction and including an inner surface that defines a hollow central portion. An internal support structure extends from the inner surface into the hollow central portion to stiffen the rotating shaft and provide a high stiffness-to-weight ratio. The internal support structures may include stiffening ribs, truss structures, mesh structures, solid disks, and/or regions having a decreased density relative to the elongated body. The elongated body and some or all internal features may be integrally formed as a single monolithic component.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline or central axis 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustor or combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gearbox 46. The power gearbox 46 includes a plurality of gears for stepping down the rotational speed of the LP shaft 36 to a more efficient rotational fan speed and is attached to one or both of a core frame or a fan frame through one or more coupling systems.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated that the exemplary turbofan 10 depicted in FIG. 1 is by way of example only and that in other exemplary embodiments, turbofan 10 may have any other suitable configuration. For example, it should be appreciated that in other exemplary embodiments, turbofan 10 may instead be configured as any other suitable turbine engine, such as a turboprop engine, turbojet engine, internal combustion engine, etc.

Referring still to FIG. 1, turbofan 10 may include a rotating shaft 100 that operably couples core engine 16 to an auxiliary system, e.g., for harnessing engine power for other useful tasks. For example, according to the illustrated embodiment, rotating shaft 100 rotatably couples LP spool 36 to an accessory gearbox 102 for transmitting input power. According to the illustrated embodiment, accessory gearbox 102 is positioned within a casing of core engine 16 and rotating shaft 100 extends along a radial direction relative to longitudinal centerline 12 of turbofan engine 10. Therefore, rotating shaft 100 is commonly referred to as a radial drive shaft.

However, it should be appreciated that accessory gearbox 102 may be placed at any other suitable location within turbofan 10 and rotating shaft 100 may transmit rotational energy between any other suitable components of turbofan 10 for any suitable purpose. In addition, although the description below refers to the construction of rotating shaft 100 for use in turbofan 10, it should be appreciated that rotating shaft 100 is used only for the purpose of explaining aspects of the present subject matter. Indeed, aspects of the present subject matter may be applied to form rotating shafts for use in automotive, aviation, maritime, and other industries to assist in operably coupling rotating components.

In general, the exemplary embodiments of rotating shaft 100 described herein may be manufactured or formed using any suitable process. However, in accordance with several aspects of the present subject matter, rotating shaft 100 may be formed using an additive-manufacturing process, such as a 3-D printing process. The use of such a process may allow rotating shaft 100 to be formed integrally, as a single monolithic component, or as any suitable number of subcomponents. In particular, the manufacturing process may allow rotating shaft 100 to be integrally formed and include a variety of features not possible when using prior manufacturing methods. For example, the additive manufacturing methods described herein enable the manufacture of rotating shafts having any suitable size and shape with multiple internal support structures and various other features defined within the hollow central portion which could not be manufactured using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral subcomponents. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and unique support structures. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved performance and reliability.

Figure 2:
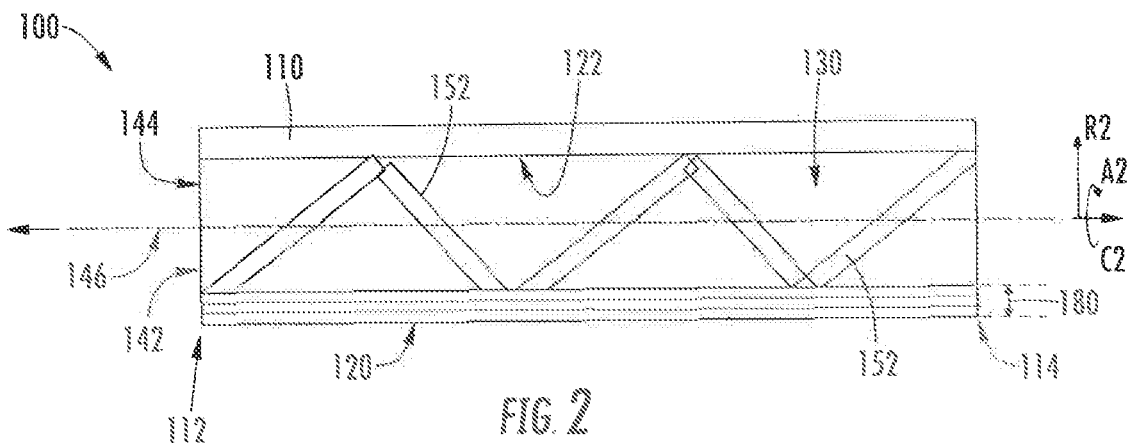
FIG. 2 provides a cross-sectional view of an additively manufactured rotating shaft according to an exemplary embodiment of the present subject matter.
Figure 3:
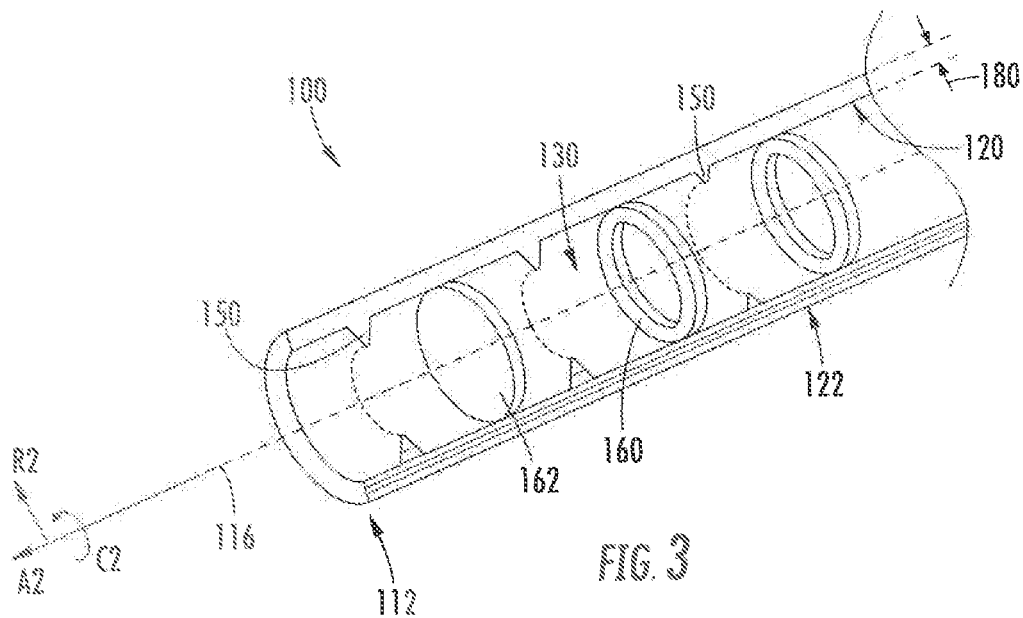
FIG. 3 provides a perspective, cross-sectional view of an additively manufactured rotating shaft according to another exemplary embodiment of the present subject matter.
Figure 4:
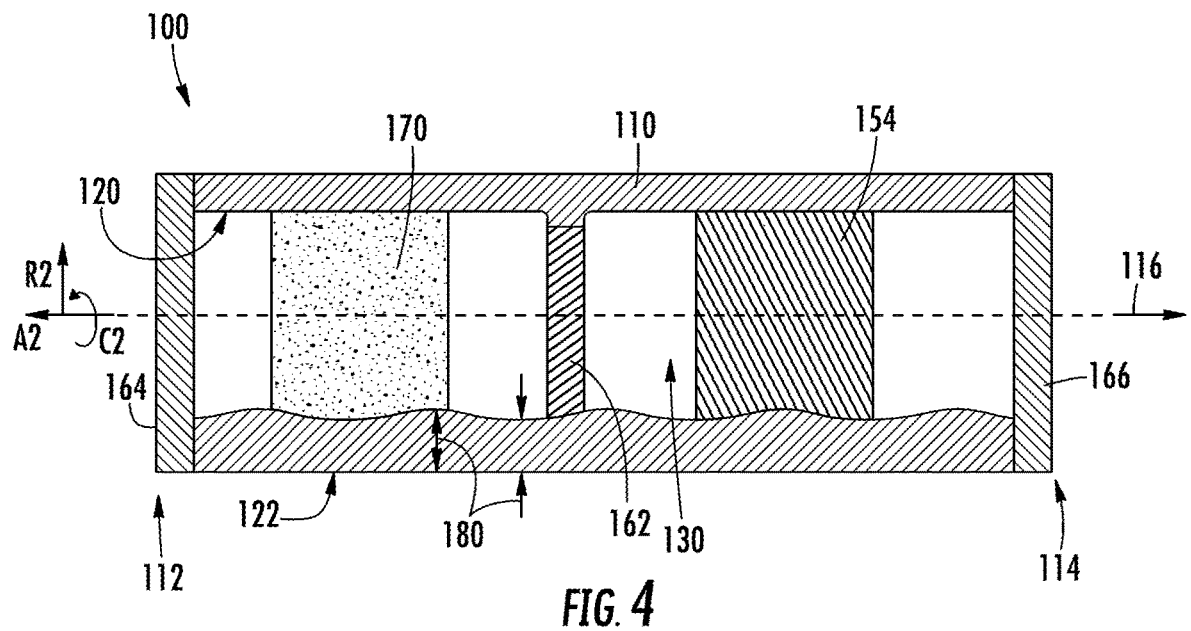
FIG. 4 provides a cross-sectional view of an additively manufactured rotating shaft according to another exemplary embodiment of the present subject matter.

Referring now to FIGS. 2 through 4, rotating shaft 100 will be described according to various exemplary embodiments of the present subject matter. In particular, FIG. 2 illustrates a schematic cross sectional view of rotating shaft 100 taken along a midplane of rotating shaft 100. FIG. 3 provides a partial perspective view of rotating shaft 100 according to another exemplary embodiment. FIG. 4 provides a cross sectional view of rotating shaft 100 according to still another exemplary embodiment of the present subject matter.

As illustrated, rotating shaft 100 generally defines an axial direction A2, a radial direction R2, and a circumferential direction C2. Rotating shaft 100 includes an elongated body 110 that extends along the axial direction A2 between a first end 112 and an opposite second end 114. In this regard, rotating shaft 100 generally defines a central axis 116 that extends along the axial direction A2 through a center of rotating shaft 100. As shown in FIG. 1, first end 112 is operably coupled to LP spool 36 and second end 114 is operably coupled to accessory gearbox 102, such that rotating shaft 100 extends along the radial direction R. In this manner, rotational energy may be bled off of LP spool 36 to drive accessory gearbox 102.

As illustrated in FIGS. 2 through 4, elongated body 110 includes an inner surface 120 and an outer surface 122 spaced apart along the radial direction R2. According to an exemplary embodiment, outer surface 122 is substantially cylindrical, while inner surface 120 may vary along the axial direction A2, as described below. Notably, elongated body 110 may be constructed of a solid metal or other rigid material between inner surface 120 and outer surface 122. In this regard, elongated body 110 may be printed such that it has a maximum density possible using the additive manufacturing process, such that there are no intentionally introduced voids or other gaps between the additive powders or material when fused.

Inner surface 120 defines a hollow central portion 130 that extends substantially along the axial direction A2 between first end 112 and second end 114. Notably, forming elongated body 110 to have a hollow central portion 130 results in a lighter weight and lower cost rotating shaft 100. However, during certain operating conditions rotating shaft 100 may experience undesirable vibrations, e.g., due to the decreased stiffness resulting from the absence of material within hollow central portion 130. To mitigate the effects of such vibrations, additive manufacturing techniques are described herein which may increase the stiffness of rotating shaft 100 without requiring a substantial amount of material to be added into hollow central portion 130. As a result, rotating shaft 100 may define a higher stiffness-to-weight ratio than a conventionally manufactured rotating shaft.

Specifically, aspects of the present subject matter provide internal support or stiffening structures (e.g., any of one or more stiffening ribs 150, a plurality of truss members 152, a plurality of thin members 154, or one or more discs, such as partial disc 160, solid discs 162, or a combination of both), referred to herein generally as internal support structures, which are generally configured for increasing the rigidity, stiffness, or other structural characteristics of rotating shaft 100. In this regard, for example, internal support structures generally extends from inner surface 120 into hollow central portion 130, e.g., to an opposite side of inner surface 120. For example, internal support structures may extend from inner surface 120 substantially along the radial direction R2, e.g. toward central axis 116. In this regard, for example, elongated body 110 may be define a first half 142 and a second half 144 defined on opposite sides of a midplane 146 (see, e.g., FIG. 2) which is defined parallel to the axial direction A2 and extends through central axis 116. In this manner, internal support structure may extend from inner surface 120 at first half 142, through a center of hollow central portion 130 to inner surface 120 at second half 142. It should be appreciated that there are many suitable types and configurations of internal support structures, only a few examples of which are described below.

For example, internal support structures may include one or more stiffening ribs 150 that extend from inner surface 120 of elongated body 110. More specifically, stiffening ribs 150 may be defined by rotating shaft 100 as extending inward along the radial direction R2, but only part of the way to central axis 116. Stiffening ribs 150 may extend circumferentially all the way around inner surface 120 or may extend only partially around inner surface 120 at a specific axial location. Alternatively, stiffening ribs 150 may have a helical shape such that they wrap around central axis 116 as they move along the axial direction A2. According to still another embodiment, stiffening ribs 150 may be spaced intermittently along the axial direction, e.g., at locations which may need additional stiffness or structural support.

According still another embodiment, internal support structure may include a truss structure, a mesh structure, a honeycomb structure, or any other tessellated pattern of support members that provides the suitable stiffness without adding too much weight. For example, as best illustrated in FIG. 2, internal support structure includes a plurality of truss members 152 that extend from one side inner surface 120 to an opposite side at an angle relative to the axial direction A2 or central axis 116. For example, as illustrated, truss members 152 extend at an angle of between about 30 and 60 degrees relative to the axial direction A2. However, it should be appreciated that truss members 152 may alternatively be defined at any angle between zero and 90 degrees relative to the axial direction A2.

In addition, it should be appreciated that only one cross sectional segment of truss members 152 is illustrated. However, it should be appreciated that truss members 152 may extend within other cross-sections of rotating shaft 100 to define a three-dimensional mesh or truss structure and may be oriented at different angles. Moreover, although truss members 152 are illustrated as being straight segments joined at inner surface 120 to provide stiffness, it should be appreciated that truss members 152 could instead be curvilinear, serpentine, helical, sinusoidal, or any other suitable shape. In addition, truss members 152 may be formed in any suitable size, number, spacing, shape, and orientation as needed depending on the application and the type of support needed. Rotating shaft 100, including elongated body 110 and internal support structures, may be symmetric or asymmetric about central axis 116. These various configurations are enabled by the additive manufacturing processes disclosed herein and are considered to be within the scope of the present subject matter.

Similarly, referring now briefly to FIG. 4, internal support structure is illustrated as a plurality of thin members 154 that are formed into a lattice structure at one axial location of rotating shaft 100. One skilled in the art will appreciate that thin members 154 may form any suitable structure within hollow central portion 130 to provide the desired stiffness or structural support. The illustrated embodiment is only intended to provide one exemplary configuration for the purpose of explanation and other configurations are possible and within the scope of the present subject matter.

Referring now to FIGS. 3 and 4, internal support structure may include one or more disks that are positioned at an axial location (e.g., along axial direction A2) and extend along the radial direction R2 within hollow central portion. More specifically, internal support structure may include partial discs 160 (e.g., which resemble a washer or a disc with a hole in the center), solid discs 162, or some combination of both. In this regard, for example, solid discs 162 are thin support members that extend across the entire hollow central portion 130, thereby obstructing the view (or access) through hollow central portion 130. Similarly, as best illustrated in FIG. 4, rotating shaft 100 may further include a solid first end 164 and a solid second end 166 positioned at first end 112 and second end 114, respectively. As explained above, ends 164, 166 may be "solid" in that they are formed at substantially the maximum density possible by the additive manufacturing process, or are otherwise impermeable to light.

Referring now to FIG. 4, rotating shaft 100 may further density differences between elongated body 110 and internal support structure to reduce weight while maintaining the desired stiffness of rotating shaft 100. In this regard, for example, internal support structure may include a low density region 170 that is formed to have a lower density than elongated body 110. In this regard, for example, low density region 170 may be formed from the same material as elongated body 110, but may include more porosity to achieve a lighter weight.

Referring still to FIG. 4, using the additive manufacturing techniques described herein, elongated body 110 may be defined to have a wall thickness 180 that varies along the axial direction A2. In this manner, wall thickness 180 may be increased at regions where more stiffness is needed and decreased at regions where weight may be reduced without sacrificing stiffness. More specifically, as illustrated, outer surface 122 may be cylindrical, but inner surface 120 may vary relative to the radial direction R2 such that wall thickness 180 is thicker where desired along the axial direction A2.

Notably, using the additive manufacturing techniques described herein, rotating shaft 100 may be defined using any suitable material or materials. For example, according to an exemplary embodiment, both elongated body 110 and internal support structure are formed from the same material, e.g., pure metal, nickel alloys, chrome alloys, titanium, titanium alloys, magnesium, magnesium alloys, aluminum, aluminum alloys, and nickel or cobalt based superalloys. However, according to alternative embodiments, elongated body 110 may be formed from a different material than internal support structure. Indeed, rotating shaft 100 may even include multiple internal support structures each formed from different materials. The examples described herein are not intended to be limiting to the scope of the subject matter.

It should be appreciated that rotating shaft 100 is described herein only for the purpose of explaining aspects of the present subject matter. For example, rotating shaft 100 will be used herein to describe exemplary configurations, constructions, and methods of manufacturing rotating shaft 100. It should be appreciated that the additive manufacturing techniques discussed herein may be used to manufacture other rotating shaft for use in any suitable device, for any suitable purpose, and in any suitable industry. Thus, the exemplary components and methods described herein are used only to illustrate exemplary aspects of the present subject matter and are not intended to limit the scope of the present disclosure in any manner.

Now that the construction and configuration of rotating shaft 100 according to an exemplary embodiment of the present subject matter has been presented, an exemplary method 200 for forming a rotating shaft according to an exemplary embodiment of the present subject matter is provided. Method 200 can be used by a manufacturer to form rotating shaft 100, or any other suitable shaft. It should be appreciated that the exemplary method 200 is discussed herein only to describe exemplary aspects of the present subject matter, and is not intended to be limiting.

Figure 5:
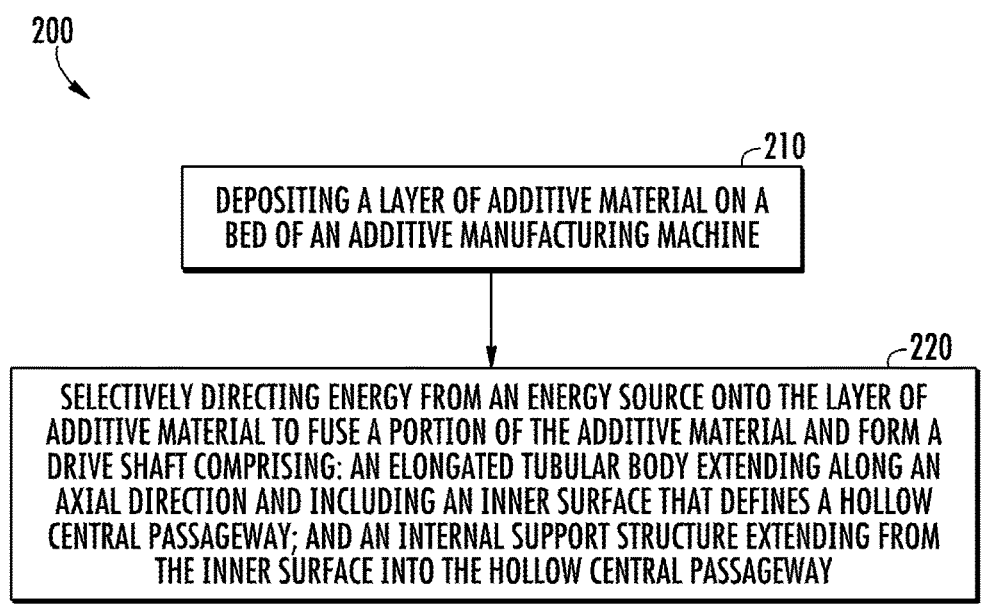
FIG. 5 is a method of manufacturing a rotating shaft according to an exemplary embodiment of the present subject matter.

Referring now to FIG. 5, method 200 includes, at step 210, depositing a layer of additive material on a bed of an additive manufacturing machine. Method 200 further includes, at step 220, selectively directing energy from an energy source onto the layer of additive material to fuse a portion of the additive material and form a rotating shaft. For example, using the example from above, rotating shaft 100 may be formed for transmitting rotational energy between two or more components.

The additively manufactured rotating shaft may include an elongated body extending along an axial direction. The elongated body may include an inner surface that defines a hollow central portion, and an internal support structure may extend from the inner surface into the hollow central portion. The internal support structure may include stiffening ribs, truss or mesh structures, wall thickness variations, low density regions, etc. The rotating shaft may further include solid internal disks or endcaps. All of these features may be formed from a single material or multiple different materials having any suitable structural properties. Notably, according to an exemplary embodiment, the elongated body, the internal support structures, the endcaps, and other features are integrally formed as a single monolithic component.

FIG. 5 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using rotating shaft 100 as an example, it should be appreciated that these methods may be applied to manufacture any suitable rotating shaft.

An additively manufactured rotating shaft and a method for manufacturing that rotating shaft are described herein. The rotating shaft includes internal stiffening structures whose practical implementations are facilitated by an additive manufacturing process and which cannot be manufactured using conventional manufacturing techniques. The internal stiffening structures may be any suitable size, position, geometry, and orientation to enhance shaft stiffness, to damp harmful vibrations during operation, or to modify the dynamic response of the rotating shaft, e.g., to avoid rotation at critical frequencies which may cause damage or failure of the rotating shaft. For example, the internal stiffening structure may be any cross sectional design and include wire mesh, truss structures, low density regions, tapered or irregular wall sections, or solid disc-shaped cross sections. Notably, these features are defined within the hollow center of the rotating shaft, such that they may not typically be formed using conventional manufacturing technologies or tools. Notably, suitable shaft stiffness may be achieved with less material, thus resulting in an improved stiffness-to-weight ratio. In addition, these features may be introduced during the design of the rotating shaft, such that they may be easily integrated into the rotating shaft during the build process at little or no additional cost. Moreover, the entire rotating shaft, including the tubular shaft body, the internal stiffening structure, the endcaps, and all other features can be formed integrally as a single monolithic component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the monolithic component.

What is claimed is:

1. An additively manufactured rotating shaft defining an axial direction and a radial direction, the rotating shaft comprising:
   an elongated body extending along the axial direction and including an inner surface that defines a hollow central portion; and
   an internal support structure extending from the inner surface into the hollow central portion, wherein the internal support structure comprises one or more solid disks extending along the radial direction across the entire hollow central portion,
   wherein the elongated body and the internal support structure are integrally formed as a single monolithic component.

2. The rotating shaft of claim 1, wherein the internal support structure comprises one or more stiffening ribs extending from the inner surface of the elongated body.

3. The rotating shaft of claim 1, wherein the internal support structure comprises a truss or mesh structure.

4. The rotating shaft of claim 1, wherein the elongated body is formed at a first density, and wherein the internal support structure comprises a low density region having a second density less than the first density.

5. The rotating shaft of claim 1, wherein the rotating shaft further comprises a solid first endcap and a solid second endcap positioned on opposite ends of the rotating shaft.

6. The rotating shaft of claim 1, wherein the elongated body defines a wall thickness that is variable along the axial direction.

7. The rotating shaft of claim 1, wherein the shaft is asymmetric about at least one of the axial direction and the radial direction.

8. The rotating shaft of claim 1, wherein the elongated body and the internal support structure are formed from a metal material.

9. The rotating shaft of claim 1, wherein the rotating shaft is operably coupled to a spool of a gas turbine engine and an accessory gearbox.

10. The rotating shaft of claim 1, wherein the internal support structure is adapted to modify the dynamic response of the rotating shaft.

11. The rotating shaft of claim 1, wherein the one or more solid disks are impermeable to light.

12. The rotating shaft of claim 11, wherein internal support structure is configured to reduce vibrations by increasing at least one of a stiffness or a stiffness to weight ratio of the rotating shaft.

13. The rotating shaft of claim 1, wherein the internal support structure is configured to reduce vibrations transferred through the rotating shaft.

14. An additively manufactured rotating shaft having a rotation axis, the rotating shaft comprising:
- a monolithic shaft component adapted to rotate about the rotation axis, the monolithic shaft component comprising an elongated body including an inner surface that defines a hollow central portion and an internal support structure extending from the inner surface into the hollow central portion, wherein the internal support structure comprises one or more solid disks extending along the radial direction across the entire hollow central portion;
- wherein the monolithic shaft component comprises a plurality of layers, each layer being formed entirely from fused additive powder material, wherein the elongated body and the internal support structure are integrally formed as a single monolithic component.

15. The rotating shaft of claim 14, wherein the monolithic shaft component is operably coupled to a spool of a gas turbine engine.

16. An additively manufactured rotating shaft having a rotation axis, the rotating shaft comprising:
- a monolithic shaft component adapted to rotate about the rotation axis, the monolithic shaft component comprising an elongated body including an inner surface that defines a hollow central portion and an internal support structure extending from the inner surface into the hollow central portion, wherein the internal support structure comprises one or more solid disks extending along the radial direction across the entire hollow central portion;
- wherein the monolithic shaft component is formed from different materials, and wherein the elongated body and the internal support structure are integrally formed as a single monolithic component.

17. The rotating shaft of claim 16, wherein the monolithic shaft component is operably coupled to a spool of a gas turbine engine.

* * * * *